(12) United States Patent
Goldsberry (10) Patent No.: US 7,931,394 B2
(45) Date of Patent: Apr. 26, 2011

(54) FRONT ACCESSORY LIGHT COVER ASSEMBLY

(75) Inventor: Nicholas Goldsberry, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 12/331,036

(22) Filed: Dec. 9, 2008

(65) Prior Publication Data

US 2009/0244918 A1   Oct. 1, 2009

Related U.S. Application Data (60) Provisional application No. 61/040,846, filed on Mar. 31, 2008.

(51) Int. Cl.
*F21V 1/00* (2006.01)
*F21V 11/00* (2006.01)

(52) U.S. Cl. .................. 362/509; 362/546; 362/549

(58) Field of Classification Search .............. 362/509, 362/546, 549, 323
See application file for complete search history.

(56) References Cited

U.S. PATENT DOCUMENTS

| D283,648 S | 4/1986 | Magee et al. |
| 4,930,050 A | 5/1990 | Poizner |
| 5,842,771 A * | 12/1998 | Thrasher et al. .............. 362/101 |
| 6,164,807 A * | 12/2000 | Gerstner et al. .............. 362/549 |
| D442,304 S | 5/2001 | Huang |
| 6,267,491 B1 | 7/2001 | Parrigin |
| 6,513,959 B2 * | 2/2003 | Serizawa et al. .............. 362/490 |
| 6,527,423 B2 * | 3/2003 | Shoji .............................. 362/509 |
| 6,698,914 B2 | 3/2004 | Berne et al. |
| 6,837,602 B1 | 1/2005 | Lee |
| 7,581,861 B2 * | 9/2009 | Ramirez et al. ............... 362/549 |
| 2009/0067186 A1 * | 3/2009 | Futami .......................... 362/516 |

FOREIGN PATENT DOCUMENTS

| DE | 3722869 C1 * | 1/1989 |
| JP | 2005271626 A * | 10/2005 |

\* cited by examiner

*Primary Examiner* — John A Ward
(74) *Attorney, Agent, or Firm* — Mark E. Duell; Rankin Hill & Clark LLP (57) ABSTRACT

A vehicle light assembly that includes a light cover and a cap is described. The light cover includes a light blocking, sealing rib that prevents undesirable light leakage around a housing of the light assembly. The cap includes one or more retention members that upon attachment of the cap to the light cover, prevent unintended detachment of the cap from the light cover.

20 Claims, 6 Drawing Sheets

FRONT ACCESSORY LIGHT COVER ASSEMBLY

FIELD OF THE INVENTION

The present invention relates to a cover and cap assembly for a vehicle light. The invention particularly relates to a cover that can be readily attached across the face of a light housing. The cover includes an opening for light to pass therethrough, and a cap that may be selectively retained within the opening.

BACKGROUND OF THE INVENTION

Vehicle accessory lights, particularly those for lighting exterior regions around a vehicle, are typically designed to reside within receptacles or housings in the vehicle body. The housings of such lights frequently reside below or behind the exterior surface of the vehicle, and a lens cover is typically used to cover the interior of the housing and one or more lighting elements contained therein.

Frequently, housings for vehicle accessory lights are integrally formed in a vehicle body panel. Or, alternatively, the vehicle body panel is formed with an integral recessed support structure that readily receives a separate light housing.

Generally, the light housing is a dish shaped or otherwise recessed receptacle that retains one or more lighting elements. The interior surface of the housing is typically reflective to promote the emission of light from the housing.

For certain applications, one or more light covers may be used in conjunction with a light housing, by placement of the cover over the open light emitting face of the housing. A light cover may be used for aesthetic reasons such as to provide a particular shaped opening through which the emitted light passes. Thus, for example a rectangular shaped light housing can be made to appear circular by placement of a light cover having a circular opening over the face of the rectangular housing. In addition, light covers can be colored or painted as desired to provide a particular appearance around a light. Light covers may also provide functional features by providing protection from stones and other debris that could impact the housing or lighting element. Although a lens cover is used in most applications, light covers can provide additional protection from such impacts.

A significant drawback with certain light covers is a result of "light leaks" around the periphery of the cover. "Light leaks" refers to spaced regions between a peripheral edge of the light cover and a side wall or portion of a housing within which the light cover is received. The spaced regions allow light emitted from the lighting element to pass through those regions. This is undesirable particularly if the light cover that is being used has an opening of a particular shape or configuration. Unintended light leaks near such opening can detract from the overall intended effect and aesthetics of the light cover.

Accordingly, it would be desirable to provide an assembly and technique for eliminating such light leaks around vehicle exterior lights.

Certain vehicle exterior accessory lights are provided with provisions so that a cap or sealing element may be removably attached over the open face of the light or a light cover attached along the face of the light. Such caps or sealing elements may be useful for various aesthetic and/or functional purposes such as those previously described with regard to light covers. In addition, such caps or sealing elements may in certain instances be used to cover an opening in a body panel if the underlying light is removed or simply not installed.

Depending upon the shape or configuration of the cap or sealing element, that component can become dislodged or otherwise loosened from its state of initial installation. This occurrence may result from vibration, differences in thermal expansion properties, and wearing of materials at the engagement interfaces. Loosening or otherwise becoming dislodged from an initial installation is undesirable for a lighting cap or cover. Such loosening may create an unsightly appearance. In addition, if the cap is allowed to become excessively loosened, the cap may become completely detached from its mounting provisions on the vehicle, and lost.

Accordingly, a need exists for an assembly and technique for reducing the likelihood of a vehicle lighting cap or sealing element from loosening or otherwise becoming dislodged.

SUMMARY OF THE INVENTION

The difficulties and drawbacks associated with previous type systems are overcome in the present method and apparatus for a cover and cap assembly for a vehicle light.

In one aspect, the present invention provides a vehicle light cover adapted to releasably attach to and overlay a light emitting face of a vehicle light assembly. The light cover comprises a panel defining a front face and an oppositely directed rear face, the rear face directed toward the vehicle light assembly upon attachment of the light cover thereto. The panel defines an edge extending around the perimeter of the panel, the panel defining an opening extending through the panel, the opening sized and shaped for light passing therethrough. The light cover also comprises a plurality of flexible engagement members projecting rearwardly from the panel. The plurality of engagement members are disposed at spaced intervals along the perimeter of the panel, each engagement member being flexible between a laterally outward position and a laterally inward position. The plurality of engagement members are positioned so as to receive and engage a portion of the vehicle light assembly. And, the light cover further comprises a light blocking rib extending rearwardly from the rear face of the panel, the rib located between the plurality of engagement members and the opening defined in the panel. The rib is spaced from the perimeter of the panel along the rear face of the panel a distance such that upon attachment of the light cover to the vehicle light assembly and engagement of the plurality of engagement members to the vehicle light assembly, the rib extends alongside an interior wall of the vehicle light assembly thereby blocking light otherwise passing between an interface of the light assembly and the light cover.

In another aspect, the present invention provides a vehicle light cover assembly adapted to releasably attach to and overlay a light emitting face of a vehicle light assembly. The light cover assembly comprises a panel defining a front face and an oppositely directed rear face. The rear face is directed toward the vehicle light assembly upon attachment of the light cover thereto. The panel defines an edge extending around the perimeter of the panel. The panel also defines an opening extending through the panel, the opening sized and shaped for light passing therethrough. The panel further defines a slot accessible from the opening. The panel includes a plurality of flexible engagement members projecting from the panel, the plurality of engagement members adapted to receive and engage a vehicle light assembly and thereby attach the light cover thereto. And, the light cover assembly additionally comprises a cap sized and shaped to be releasably engaged in the opening defined in the panel. The cap defines a front face and an oppositely directed rear face. The cap includes a plurality of flexible engagement members projecting rearwardly from the cap, the plurality of engagement members adapted to receive and engage the panel of the light cover assembly and thereby attach the cap thereto. The cap also includes at least one retention member extending outward from at least one of the flexible engagement members and adapted to be disposed in the slot defined in the panel to thereby provide further securing of the cap with respect to the panel of the light cover assembly.

In yet another aspect, the present invention provides a vehicle light assembly comprising a light housing including a plurality of walls extending from a base. The walls and base define a hollow interior accessible from a light emitting face. The base is adapted to receive and retain a light emitting element. The walls define a lip extending around the periphery of the light emitting face, the lip disposed proximate a distal region of the walls with respect to the base. The light assembly also comprises a panel defining a front face and an oppositely directed rear face. The panel defines an edge extending around the perimeter of the panel. The panel defines an opening extending through the panel, and a slot accessible from the opening. The panel includes a plurality of flexible engagement members projecting from the panel, the plurality of engagement members adapted to receive and engage the lip of the light housing and thereby attach the panel thereto. And, the light assembly additionally comprises a cap sized and shaped to be releasably engaged in the opening defined in the panel. The cap defines a front face and an oppositely directed rear face. The cap includes a plurality of flexible engagement members projecting rearwardly from the cap, the plurality of engagement members adapted to receive and engage the panel and thereby attach the cap thereto. The cap also includes a retention member extending from an engagement member and adapted to be disposed in the slot defined in the panel to thereby provide further securing of the cap with respect to the panel.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
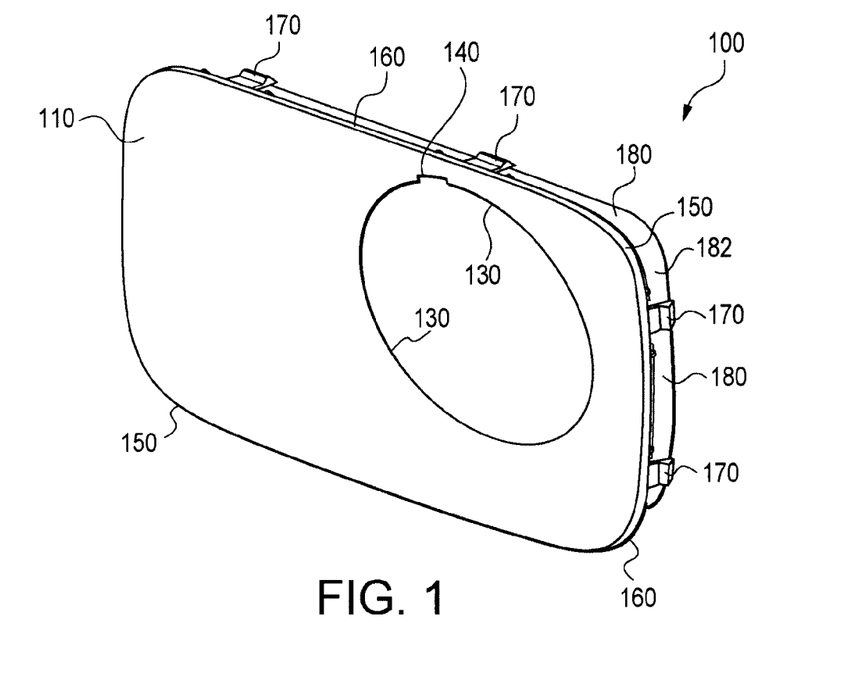
FIG. 1 is a perspective view of a front face of a preferred embodiment light cover in accordance with the present invention.
Figure 2:
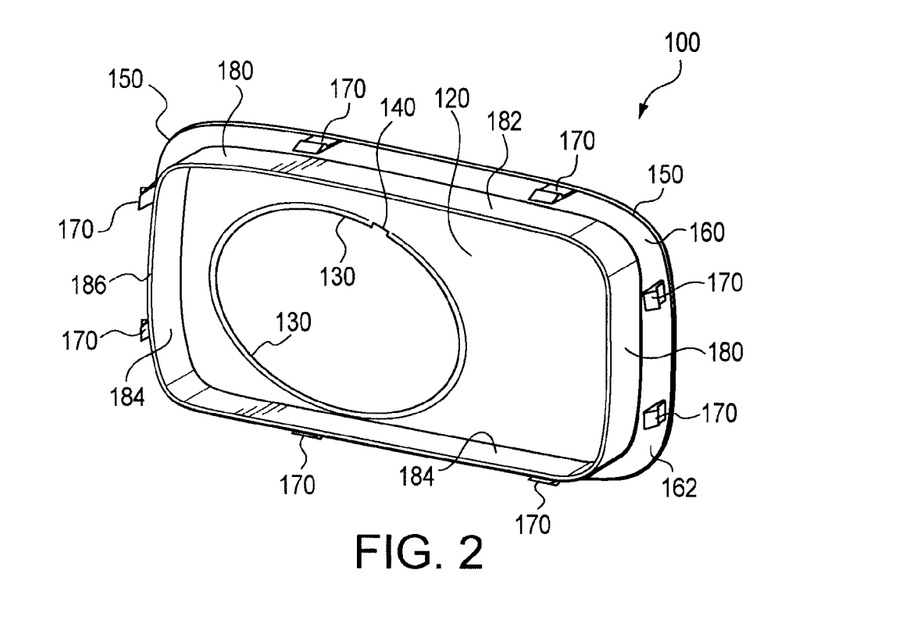
FIG. 2 is a perspective view of a rear face of the preferred embodiment light cover depicted in FIG. 1.

FIGS. 1 and 2 are perspective views showing a front face and a rear face, respectively, of a preferred embodiment light cover 100 in accordance with the present invention. The light cover or panel 100 defines a front face 110, an oppositely directed rear face 120, and an opening or aperture 130 for emission of light through the cover 100. Upon attachment of the light cover 100 to a vehicle light assembly, the rear face 120 of the cover 100 is directed toward the vehicle light assembly and the front face 110 is directed toward the direction of light emission. As described in greater detail herein, the cover 100 also defines an optional engagement slot 140 that is accessible from the aperture 130. The cover 100 includes an outer edge or periphery 150 generally extending around the perimeter of the cover 100. Preferably extending around the periphery 150 of the cover 100 is a lip 160. Defined on the rearwardly directed face of the lip 160, is a lip surface 162. The cover also preferably includes one or more fasteners 170 disposed around the periphery 150 of the cover 100. As described in greater detail herein, the one or more fasteners 170 are preferably in the form of flexible engagement members. Preferably, the fasteners 170 are disposed at spaced intervals along the perimeter of the cover 100. Each fastener 170 is preferably positionally flexible between a laterally outward receiving position and a laterally inward engagement position. The collection of fasteners 170 are positioned so as to receive and engage a portion of a housing or other component of the vehicle light assembly. The number of fasteners 170 provided along an outer region of the cover 100 can range from one to twenty or more. However, it is generally preferred that the fasteners 170 range in number from four to twelve, more preferably from six to ten, and most preferably number eight per cover.

Preferably disposed along the rear face 120 of the cover 100 is a light blocking sealing rib 180. The rib is preferably located between the collection of fasteners 170 and the aperture 130 defined in the cover 100, along the rear face 120 of the cover 100. The sealing rib 180 may be continuous such that it forms a single integral component, or may be in the form of a plurality or collection of sealing ribs spaced apart from one another. The preferred form of the rib 180 is a single continuous rib, and so that version will be described herein. For versions of the light cover using a continuous sealing rib, it is preferred that the rib extends rearwardly along an outer periphery of the cover. The outer periphery may include the perimeter of the cover, or a region extending alongside the perimeter. The rib 180 defines an outwardly directed first face 182 and an oppositely directed inner second face 184. A distal edge 186 is defined along the interface of the first and second faces 182 and 184.

Figure 3:
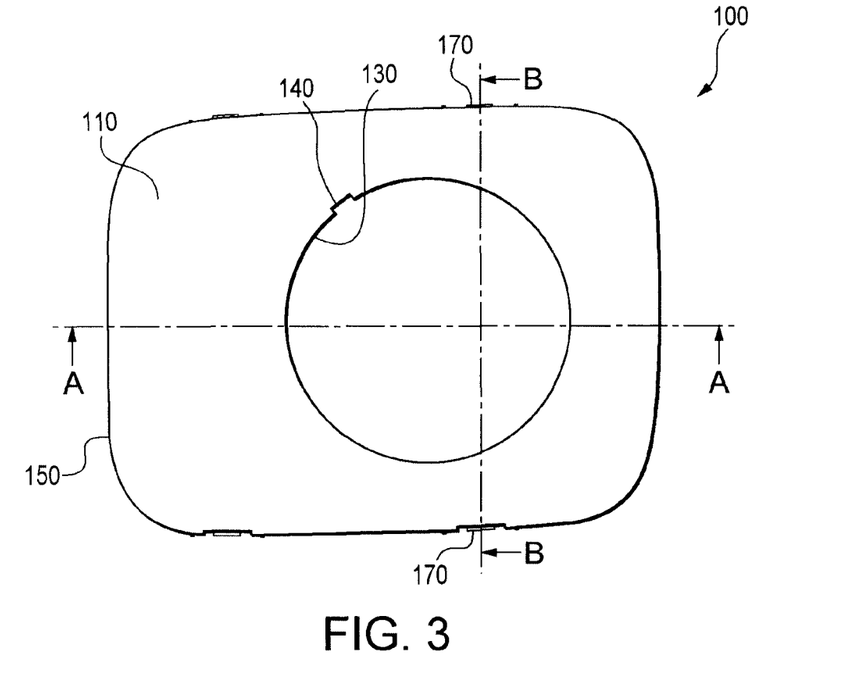
FIG. 3 is a front view of the preferred embodiment light cover of FIG. 1.

FIG. 3 is a front view of the preferred embodiment light cover 100 depicted in FIGS. 1 and 2. It will be appreciated that although the opening or aperture 130 is depicted as having a round shape, the present invention includes a wide array of other shapes and configurations for the aperture 130. Preferably, the aperture 130 is sized and shaped for light passing therethrough. The aperture is sized so that the aperture is large enough so that a relatively high proportion of light emitted from a lighting element can pass through the aperture. The aperture is shaped so that the aperture exhibits an aesthetically pleasing appearance, particularly upon actuation of the light. For example, the aperture in the preferred embodiment light cover can be square, rectangular, polysided, slotted, irregular in shape, or triangular. It is also contemplated that the light cover can define a plurality of apertures, such as two, three, four, or more in number. And, these various apertures can be the same in shape, or have different shapes.

Figure 4:
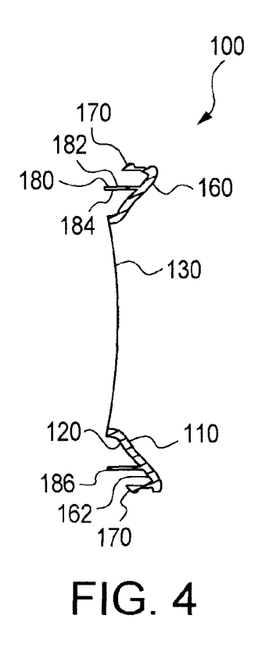
FIG. 4 is a cross section view of the preferred embodiment light cover taken across section line BB in FIG. 3.

FIG. 4 is a cross section view of the preferred embodiment light cover 100 taken across section line BB in FIG. 3. FIG. 4 illustrates a typical configuration of the lip 160 and sealing rib 180 of the cover 100. FIG. 4 also illustrates fasteners 170 disposed along an outer region of the lip 160. Preferably, the fasteners 170 project rearwardly and in the same general direction as the sealing rib 180. It is also preferred that the fasteners 170 are spaced outwardly from the sealing rib 180 by the lip surface 162. The fasteners 170 and the sealing rib 180 preferably extend rearwardly from the rear face 120 of the light cover 100, and may be independently oriented from the rear face 120 by an angle of from about 30° to about 150°. Regardless of the angle of the fasteners 170 and the sealing rib 180 with respect to the rear face 120 of the cover 100, it is preferred that the fasteners 170 and rib 180 are generally parallel to one another as depicted in FIG. 4. FIG. 4 also illustrates a sealing rib 180 extending from the rear face 120 of the cover 100 and the oppositely directed faces 182 and 184 and edge 186 of the rib 180.

Figure 5:
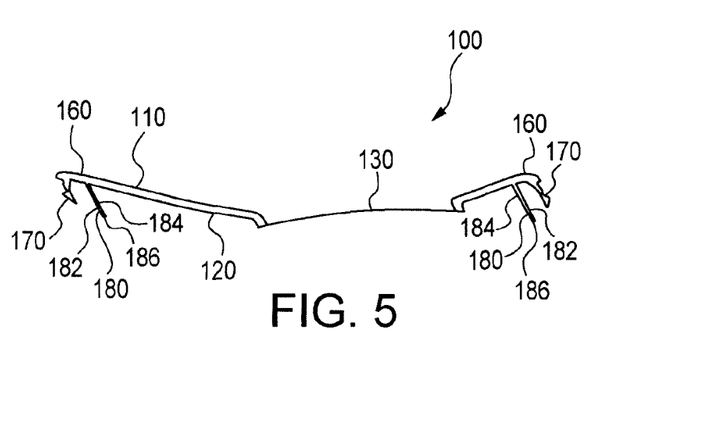
FIG. 5 is a cross section view of the preferred embodiment light cover taken across section line AA in FIG. 3.

FIG. 5 is a cross section view of the preferred embodiment light cover 100 taken across section line AA in FIG. 3. FIG. 5 further illustrates a typical configuration of the lip 160 and the sealing rib 180 of the cover 100. FIG. 5 also illustrates the fasteners 170 disposed along an outer region of the lip 160. Preferably, the fasteners 170 project rearwardly and in the same general direction as the sealing rib 180. It will be appreciated that the angle at which the fasteners 170 and the sealing rib 180 extend relative to the rear face 120 of the cover 100 may vary depending upon the location along the rear face 120 at which such assessment is made. As noted in the description of FIG. 4, it is preferred that the fasteners and the rib 180 extend in a parallel fashion. Regarding FIG. 5, it is to be understood that although the section line AA in FIG. 3 does not pass through a fastener 170, such fasteners would still be evident, hence their inclusion in FIG. 5. Moreover, the location of fasteners 170 is not crucial, and the present invention includes positioning fasteners 170 at any location along the periphery 150 of the cover 100.

Figure 6:
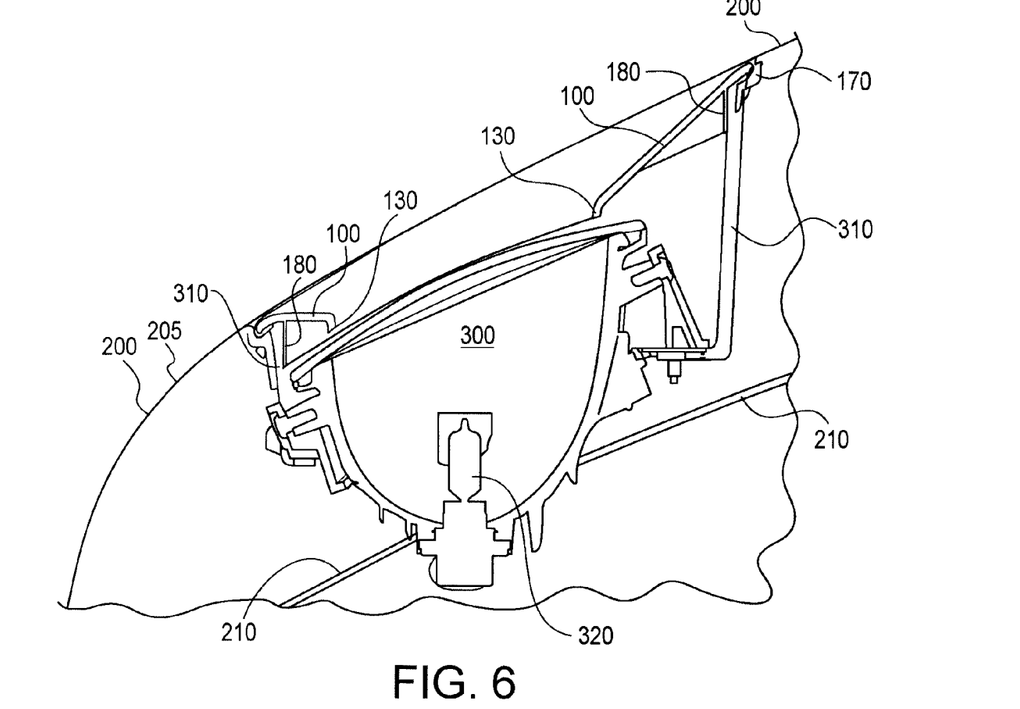
FIG. 6 is a schematic view illustrating the preferred embodiment light cover of FIG. 1 and its engagement with a light assembly disposed in a vehicle body panel.

FIG. 6 is a schematic view illustrating the preferred embodiment light cover 100 of FIG. 1 and its engagement with a light assembly 300 disposed in a vehicle body panel 200. Specifically, the cover 100 extends across an open face of the light assembly 300. The aperture 130 is preferably located such that upon attachment of the cover 100 to the light assembly 300, the aperture 130 is directly adjacent to and aligned with a light element 320. Preferably, the light blocking rib 180 is spaced from the perimeter of the cover 100 along the rear face of the cover 100 a distance such that upon attachment of the cover 100 to the vehicle light assembly 300 and engagement of the collection of fasteners 170 to a housing 310 of the vehicle light assembly 300, the rib 180 extends alongside an interior wall of the housing 310 thereby blocking light otherwise passing between an interface of the cover 100 and the light assembly 300. FIG. 6 depicts a typical installation of the light assembly 300 within a vehicle body panel 200. One or more support members 210 associated with the vehicle body panel, or the vehicle itself, may serve to support the light assembly 300. Upon engagement of the light cover 100 to the light housing 310, it is preferred that the cover 100 be flush or recessed with respect to an adjacent outer surface 205 of the vehicle body panel 200.

Figure 7:
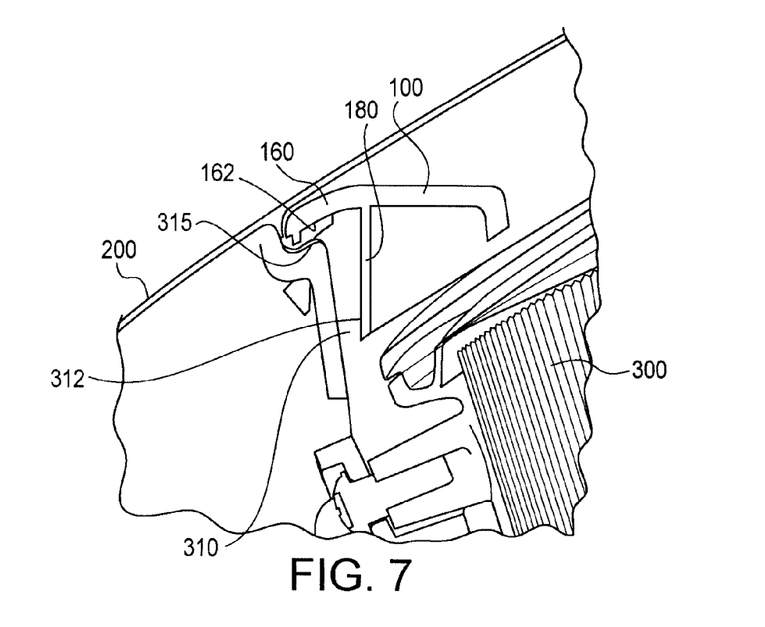
FIG. 7 is a detailed schematic view illustrating a portion of the preferred embodiment light cover, the light assembly, and the vehicle body panel depicted in FIG. 6.

FIG. 7 is a detailed schematic view illustrating a portion of the preferred embodiment light cover 100, the light assembly 300, and the vehicle body panel 200 depicted in FIG. 6. FIG. 7 illustrates a preferred embodiment engagement configuration between the light cover 100 and the light assembly 300. Preferably, the lip 160 of the light cover 100 is received by the light housing 310, such that the lip surface 162 contacts or is in very close proximity to a support ledge 315 defined by the housing 310. The sealing rib 180 is preferably oriented such that the rib 180 extends alongside an inner face 312 of the light housing 310. As shown in FIG. 7, this configuration between the sealing rib 180 and the light housing 310 precludes the emission of light between the interface of those two components, which if occurring, is referred to herein as light leakage.

Figures 8, 10:
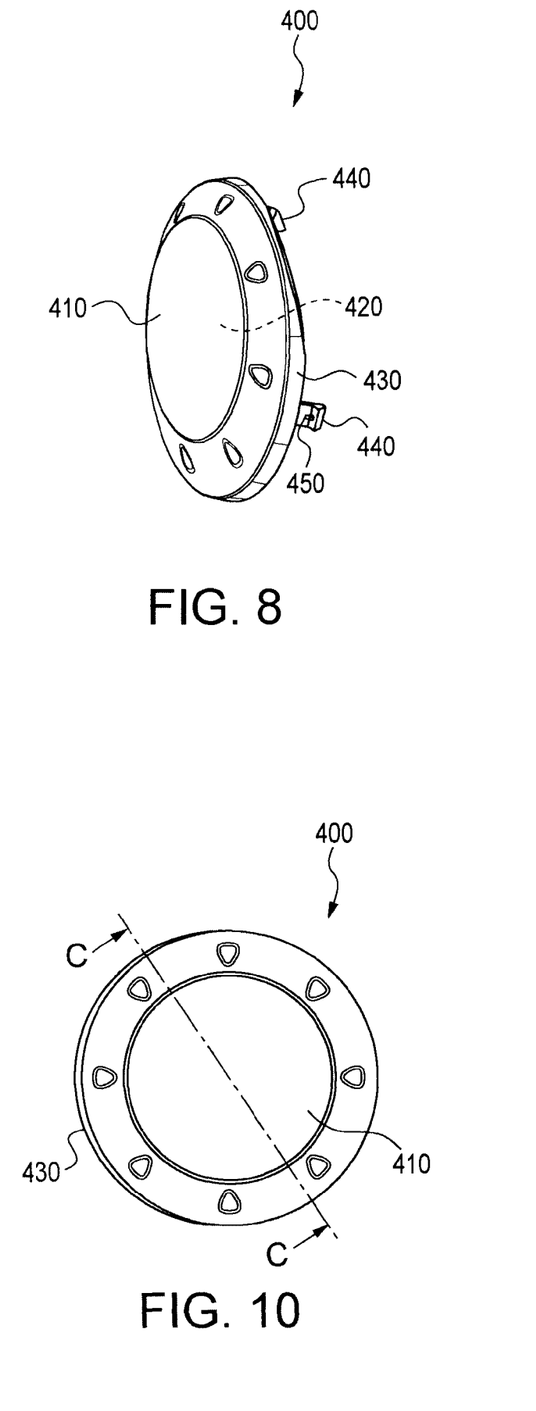
FIG. 8 is a perspective view of a preferred embodiment light cover cap in accordance with the present invention.
FIG. 10 is a front and partial perspective view of the preferred embodiment light cover cap shown in FIG. 8.

FIG. 8 is a perspective view of a preferred embodiment light cover cap 400 in accordance with the present invention. The cap 400 defines a front face 410, an oppositely directed rear face 420, an outer edge 430 extending between those faces, and one or more fasteners 440. The fasteners preferably extend rearwardly from the cap 400, and most preferably from the outer edge 430 or the rear face 420 of the cap 400. The fasteners are preferably flexible members that are adapted to flexibly deform to receive and engage regions of the previously described light cover 100 best shown in FIGS. 1-3, and particularly regions of the cover 100 proximate the aperture 130 defined in the cover 100. As described in greater detail herein, at least one retention member 450 is disposed on one or more fasteners 440. Upon engagement of the cap 400 within the aperture 130 of the light cover 100, the retention member is preferably aligned with and positioned within the engagement slot 140 of the cover 100. This configuration reduces or preferably, essentially eliminates the possibility of the cap 400 becoming disengaged or otherwise detached from the light cover 100.

Figures 9, 11:
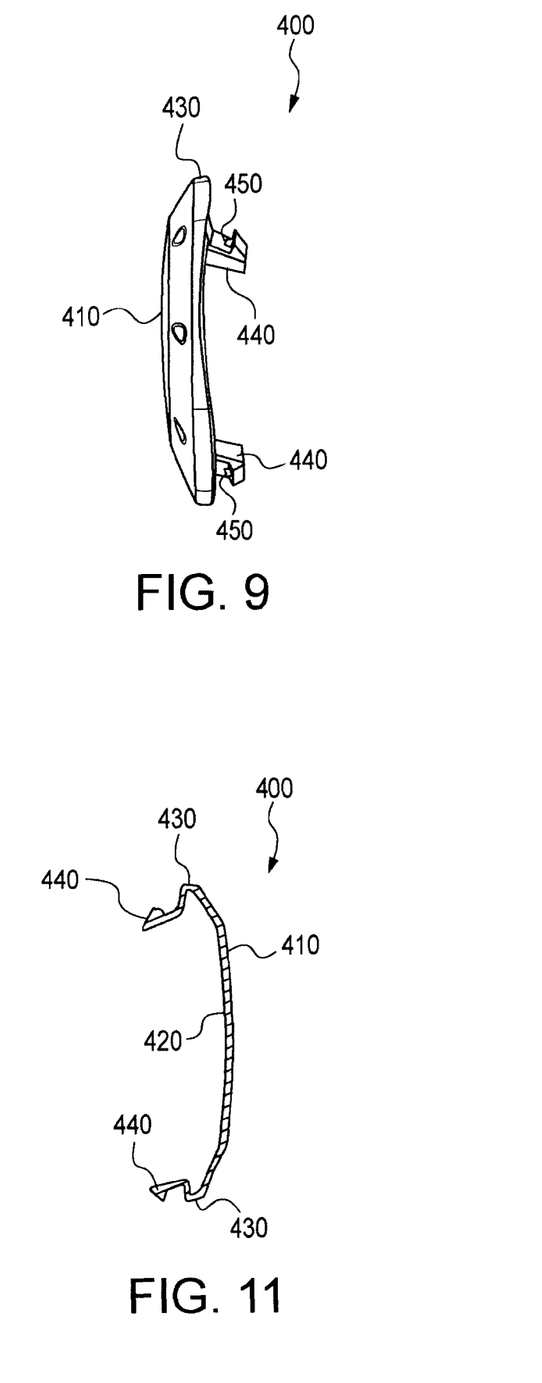
FIG. 9 is a side view of the preferred embodiment light cover cap shown in FIG. 8.
FIG. 11 is a cross section view of the preferred embodiment light cover cap, taken across section line CC in FIG. 10.

FIG. 9 is a side view of the preferred embodiment light cover cap 400 shown in FIG. 8. FIG. 9 depicts a version of the preferred embodiment cap 400 in which a retention member 450 is provided on two or more fasteners 440. It is to be understood however, that the present invention includes the use of a single retention member 450 on only one of a plurality of fasteners 440.

FIG. 10 is a front view of the preferred embodiment light cover cap 400 shown in FIG. 8. Depending upon the preferences of the vehicle designer or owner, it may be preferred to paint the front face 410 of the cover 400 with the same paint as applied to the front face 110 of the cover 100. It is also contemplated to provide one or more markings or other decorative indicia along the front face 410 of the cap 400. In addition, one or more raised regions or recessed regions can be provided or otherwise formed along the front face 410 of the cap 400.

FIG. 11 is a cross section view of the preferred embodiment light cover cap 400, taken across section line CC in FIG. 10. FIG. 11 illustrates a preferred configuration and orientation of the fasteners 440 extending rearwardly from the cap 400. FIG. 11 illustrates that in certain embodiments, it may be preferred that the fasteners 440 although extending parallel to one another, extend at some angle other than 90° from the rear face 420 of the cap 400. It will be appreciated that the present invention includes embodiments of the cap in which one or more fasteners independently extend rearwardly at angles of from about 30° to about 150°.

Figure 12:
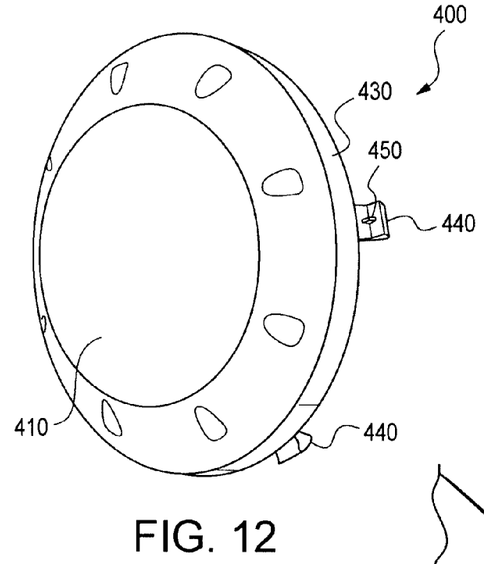
FIG. 12 is another perspective view of the preferred embodiment light cover cap illustrating in greater detail a fastener and a retention element on the fastener in accordance with the preferred embodiment.

FIG. 12 is another perspective view of the preferred embodiment light cover cap 400 illustrating in greater detail a fastener 440 and a retention element 450 on the fastener in accordance with the preferred embodiment. The number of fasteners 440 per cap may vary from one to as many as twelve or more. However, typically, three to five are sufficient to retain the cap to the light cover. The fasteners are preferably equally spaced from each other around the periphery of the cap. And, it is also preferred that the fasteners are all of the same type, configuration, size and shape. However, it is to be appreciated that the present invention includes the use of different types, sizes, shapes, and configurations of fasteners on a single cap.

Figure 13:
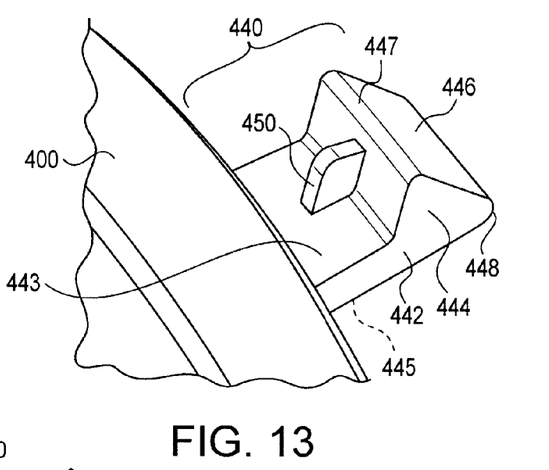
FIG. 13 is a detailed view of a fastener shown in FIG. 12, illustrating a preferred embodiment retention element.

FIG. 13 is a detailed view of the fastener 440 shown in FIG. 12, illustrating a preferred embodiment retention element 450. The preferred embodiment fastener 440 includes an outwardly extending projection 442 and a retention member 444 that provides a distal tip 448 of the projection 442. The projection 442 defines a front face 443 and an oppositely directed rear face 445. Preferably, the retention member 444 defines an inclined engagement surface 446 which, upon engagement of the cap 400 to the light cover 100, contacts a portion of the cover 100. Depending upon the particular configuration of the fastener 440 and the light cover 100, it is generally preferred that the engagement surface 446 is inclined relative to the longitudinal axis of the projection 442. As noted, it is preferred that the fastener 440 be flexible, and so, upon engagement of the fastener 440 with a portion of the light cover 100, such as during installation of the cap 400 with the cover 100, the engagement surface 446 is contacted with a surface of the cover 100 and particularly an inner edge of the cover defining the opening 130. The angled orientation of that surface 446 relative to the cover surface causes the projection 442 to be flexibly and temporarily deformed until the edge of the aperture 130 passes an apex 447 of the fastener 440. After the edge of the cover 100 passes the apex 447, the projection 442 returns to its original position such that the front face 443 of the projection 442 of the fastener 440 contacts or is at least in very close proximity to, the rear face 120 of the light cover 100, and particularly the rear face 120 adjacent the aperture 130.

Figure 14:
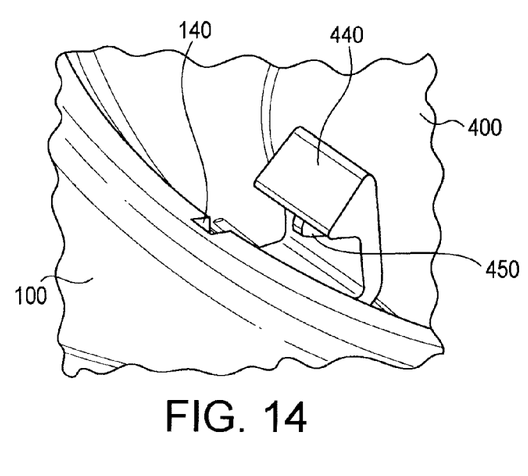
FIG. 14 is a partial schematic view illustrating engagement between the retention element of the light cover cap, and an engagement slot defined in the preferred embodiment light cover.

FIG. 14 is a partial schematic view illustrating engagement between the retention element 450 disposed on a fastener 440 of the light cover cap 400, and the engagement slot 140 defined in the preferred embodiment light cover 100. Preferably, the retention element 450 is of a size and shape so as to be received within the slot 140. Upon engagement within the slot 140, the retention element 450 prevents movement of the cap 400 retained within the aperture 130 of the light cover 100. Specifically, the retention element 450 precludes rotation of the cap 400. As previously explained, it is common for such retained caps, particularly if round, to become dislodged or otherwise disengaged from a cover to which they were attached as a result of vibrations or impacts with road debris.

Figure 15:
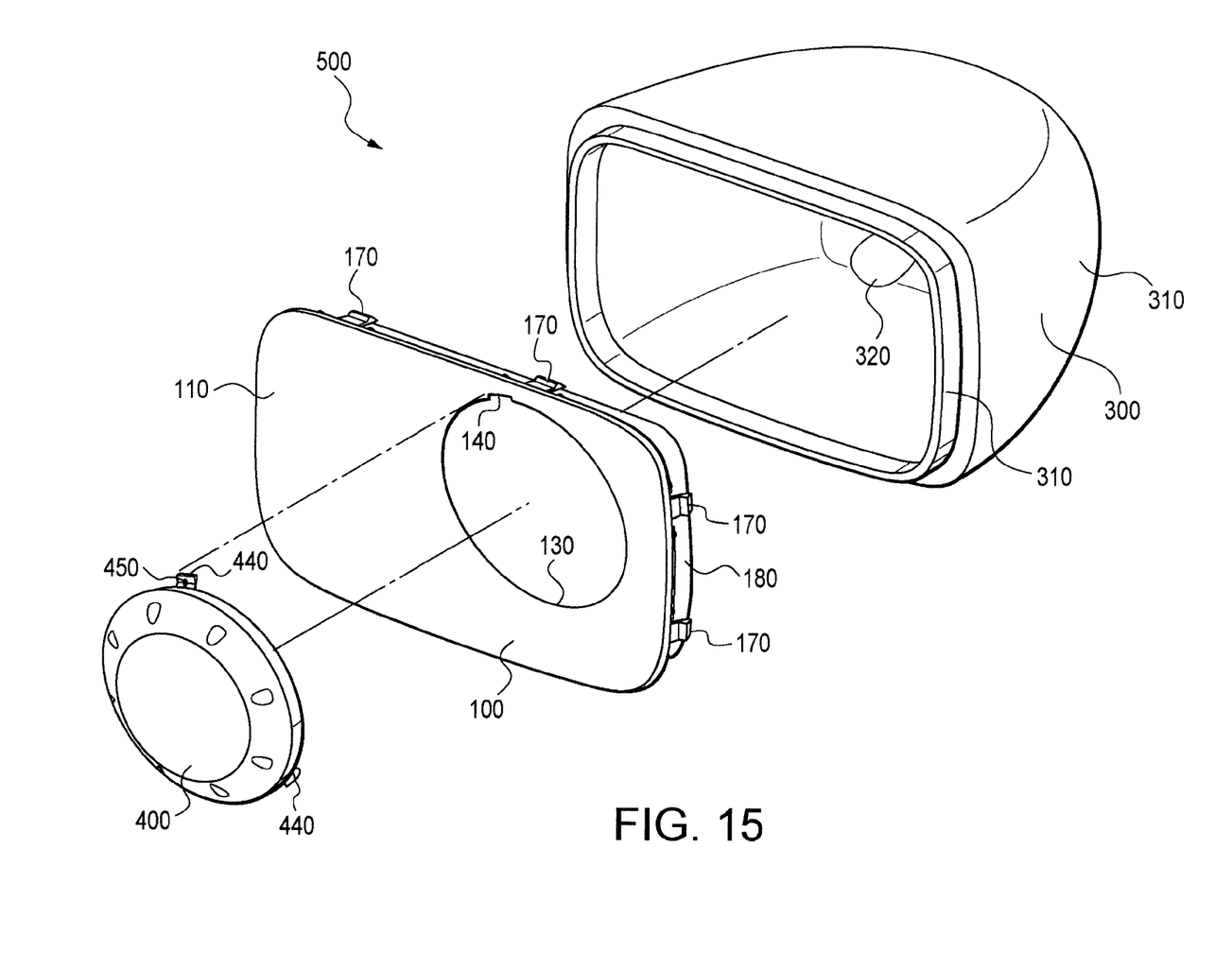
FIG. 15 is an exploded schematic view of a preferred embodiment system comprising a preferred embodiment cap, a preferred embodiment light cover, and a light assembly, in accordance with the present invention.

FIG. 15 is an exploded schematic view of a preferred embodiment system 500 comprising a preferred embodiment cap 400, a preferred embodiment light cover 100, and a light assembly 300, in accordance with the present invention. FIG. 15 illustrates a preferred configuration such that the cap 400 is engagable with the cover 100 by placement of the cap 400 over the aperture 130 defined in the cover 100. The cap 400 is oriented such the fastener 440 having the retention element 450 is aligned with the slot 140. Upon pressing the cap 400 over the aperture 130, the retention element 450 is received and engaged in the slot 140. It will be understood that the distal portions of the fasteners 440 are urged inwardly during placement of the cap 400 over the aperture 130 and then released or otherwise allowed to return to their initial state after a distal portion of each fastener passes the rear face of the light cover 100 thereby engaging the cap 400 to the cover 100. Similarly, the cover 100 is engaged to the light housing 310 by pressing the cover 100 onto the open face of the housing 310. The plurality of fasteners 170 are urged inward so that the cover can be fittingly engaged to and in close contact with the open face of the housing 310.

The light cover and the cap can be formed from a wide array of materials. That is, nearly any type of material typically used in the automotive arts can be used, such as metals and various polymeric materials. For polymeric materials, it is preferred that resins be used such as polystyrene, ABS or acrylonitrile butadiene styrene (a ter-polymer or mixture of compounds), nylon (chemically resistant, heat resistant, tough and flexible), polypropylene (tough and flexible), polyethylene, and polyvinyl chloride or PVC. Preferably, both the light cover and the cap are formed from polypropylene.

The light cover and cap can be formed to exhibit a desired color or combination of colors. Often this determination will depend upon the exterior color of the vehicle. Color can be imparted to the light cover and to the cap by including a dye or coloring agent in the resin material prior to molding. Alternatively, the part, once molded, can be subjected to a painting operation. It is also contemplated to form the light cover and/or the cap from one or more materials that are translucent. This may provide a desired aesthetic effect upon actuation of the light assembly. Thus, in this contemplated embodiment, the cap could be formed from a yellow, green, blue, red, or other color so as to provide a tinted translucent material. Upon placement of the cap over the aperture defined in the light cover, a unique lighting effect can be realized. However, it is generally preferred that both the light cover and the cap be opaque.

It will be appreciated that the presently described light covers and caps are for use with either a left hand version of a light assembly, or a right hand version of such an assembly. That is, the covers and caps described herein are depicted in the referenced figures as configured for only one side of a vehicle. It will be understood that a corresponding set of light cover and cap configured for the other side would be essentially identical to those described and shown herein, except that the corresponding set would be a mirror image thereof.

The light covers and caps described herein can be formed in a variety of fashions, primarily depending upon the material(s) selected for forming the covers and caps. For polymeric materials, it is generally preferred to form the covers and caps by one or more injection molding operations.

The present invention light covers and caps can be used in association with a wide array of vehicle lights. For example, the inventive light covers and caps can be used in conjunction with vehicle fog lights, accessory lights, front exterior lights, side exterior lights and the like.

Many other benefits will no doubt become apparent from future application and development of this technology.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A vehicle light cover adapted to releasably attach to and overlay a light emitting face of a vehicle light assembly, the light cover comprising:

a panel defining a front face and an oppositely directed rear face, the rear face directed toward the vehicle light assembly upon attachment of the light cover thereto, the panel defining an edge extending around the perimeter of the panel, the panel defining an opening extending through the panel, the opening sized and shaped for light passing therethrough;

a plurality of flexible engagement members projecting rearwardly from the panel, the plurality of engagement members disposed at spaced intervals along the perimeter of the panel, each engagement member being flexible between a laterally outward position and a laterally inward position, the plurality of engagement members positioned so as to receive and engage a portion of the vehicle light assembly; and a light blocking rib extending rearwardly from the rear face of the panel, the rib located between the plurality of engagement members and the opening defined in the panel, the rib also being spaced from the perimeter of the panel along the rear face of the panel a distance such that upon attachment of the light cover to the vehicle light assembly and engagement of the plurality of engagement members to the vehicle light assembly, the rib extends alongside an interior wall of the vehicle light assembly thereby blocking light otherwise passing between an interface of the light assembly and the light cover.

2. The vehicle light cover of claim 1, wherein the light blocking rib is continuous and extends around an outer periphery of the panel.

3. The vehicle light cover of claim 1 wherein the flexible engagement members range in number from four to twelve per panel.

4. The vehicle light cover of claim 3 wherein the flexible engagement members number eight per panel.

5. The vehicle light cover of claim 1 wherein the opening defined in the panel is round.

6. The vehicle light cover of claim 1 wherein the panel further defines an engagement slot accessible from the opening.

7. A vehicle light cover assembly adapted to releasably attach to and overlay a light emitting face of a vehicle light assembly, the light cover assembly comprising:

a panel defining a front face and an oppositely directed rear face, the rear face directed toward the vehicle light assembly upon attachment of the light cover thereto, the panel defining an edge extending around the perimeter of the panel, the panel defining an opening extending through the panel, the opening sized and shaped for light passing therethrough, the panel further defining a slot accessible from the opening, the panel including a plurality of flexible engagement members projecting from the panel, the plurality of engagement members adapted to receive and engage a vehicle light assembly and thereby attach the light cover thereto; and a cap sized and shaped to be releasably engaged in the opening defined in the panel, the cap defining a front face and an oppositely directed rear face, the cap including a plurality of flexible engagement members projecting rearwardly from the cap, the plurality of engagement members adapted to receive and engage the panel of the light cover assembly and thereby attach the cap thereto, the cap also including at least one retention member extending outward from at least one of the flexible engagement members and adapted to be disposed in the slot defined in the panel to thereby provide further securing of the cap with respect to the panel of the light cover assembly.

8. The vehicle light cover assembly of claim 7 wherein the panel further includes a light blocking rib extending rearwardly from the rear face of the panel.

9. The vehicle light cover assembly of claim 8, wherein the light blocking rib is continuous and extends around an outer periphery of the panel.

10. The vehicle light cover assembly of claim 7 wherein the flexible engagement members of the panel range in number from four to twelve per panel.

11. The vehicle light cover assembly of claim 10 wherein the flexible engagement members number eight per panel.

12. The vehicle light cover assembly of claim 7 wherein the opening defined in the panel is round.

13. The vehicle light cover assembly of claim 7 wherein the cap includes a total of from one to twelve of the flexible members.

14. The vehicle light cover assembly of claim 13 wherein the cap includes a total of three to five flexible engagement members.

15. The vehicle light cover assembly of claim 7 wherein the cap includes a first retention member extending outward from a first flexible engagement member, and a second retention member extending outward from a second flexible engagement member.

16. A vehicle light assembly comprising:

a light housing including a plurality of walls extending from a base, the walls and base defining a hollow interior accessible from a light emitting face, the base adapted to receive and retain a light emitting element, the walls defining a lip extending around the periphery of the light emitting face, the lip disposed proximate a distal region of the walls with respect to the base;

a panel defining a front face and an oppositely directed rear face, the panel defining an edge extending around the perimeter of the panel, the panel defining an opening extending through the panel, the panel further defining a slot accessible from the opening, the panel including a plurality of flexible engagement members projecting from the panel, the plurality of engagement members adapted to receive and engage the lip of the light housing and thereby attach the panel thereto; and a cap sized and shaped to be releasably engaged in the opening defined in the panel, the cap defining a front face and an oppositely directed rear face, the cap including a plurality of flexible engagement members projecting rearwardly from the cap, the plurality of engagement members adapted to receive and engage the panel and thereby attach the cap thereto, the cap also including a retention member extending from an engagement member and adapted to be disposed in the slot defined in the panel to thereby provide further securing of the cap with respect to the panel.

17. The vehicle light assembly of claim 16 wherein the panel further includes a light blocking rib extending rearwardly from the panel.

18. The vehicle light assembly of claim 17 wherein the light blocking rib is continuous and extends around an outer periphery of the panel.

19. The vehicle light assembly of claim 16 wherein the opening defined in the panel is round.

20. The vehicle light assembly of claim 16 wherein the cap further includes a second retention member extending from another engagement member.

\* \* \* \* \*